United States Patent [19]
Ishii et al.

[11] 3,767,502
[45] Oct. 23, 1973

[54] PROCESS FOR PRODUCING A SUPPORTED SEMIPERMEABLE MEMBRANE WHICH DOES NOT REQUIRE END SEALING

[75] Inventors: Kiyoshi Ishii; Shobu Konomi, both of Iruma; Yoshio Ishiguro, Tokyo, all of Japan

[73] Assignee: Daicel Ltd., Osaka, Japan

[22] Filed: Dec. 29, 1971

[21] Appl. No.: 213,835

[30] Foreign Application Priority Data
Dec. 30, 1970 Japan.............................. 45/122242

[52] U.S. Cl.................. 156/242, 210/321, 215/500, 264/263
[51] Int. Cl......................... B29c 27/00, B01d 13/00
[58] Field of Search.................... 210/321, 433, 490, 210/500; 264/263; 156/242

[56] References Cited
UNITED STATES PATENTS
2,241,355  5/1941  Maclachlan......................... 156/242
3,421,782  1/1969  Kalish et al......................... 210/321
3,480,147  11/1969  Kanyok............................... 210/321
3,542,204  11/1970  Clark .................................. 210/321
3,610,418  10/1971  Calderwood....................... 210/321
3,657,402  4/1972  Stana et al.......................... 210/500

*Primary Examiner*—Douglas J. Drummond
*Attorney*—Robert E. Woodhams et al.

[57] ABSTRACT

A supported semipermeable membrane is prepared by affixing sealing members to the end of a permeable support and then applying a semipermeable membrane forming solution on the support and the sealing members to cover them with a continuous semipermeable membrane, said sealing members being made of a material which can be dissolved by the semipermeable membrane forming solution to form a welded unity with the semipermeable membrane, whereby the ends of the membrane are sealed without the use of an adhesive.

5 Claims, 4 Drawing Figures

PATENTED OCT 23 1973 3,767,502

PROCESS FOR PRODUCING A SUPPORTED SEMIPERMEABLE MEMBRANE WHICH DOES NOT REQUIRE END SEALING

BACKGROUND OF THE INVENTION

1. Field of the Invention

The present invention relates to a process for producing a supported semipermeable membrane and which does not require sealing of its ends.

2. Description of the Prior Art

It has been known to employ dialysis, reverse osmosis, and ultra-filtration etc. in the separation, purification and concentration, etc., of a mixed solution, such as saline water. For this purpose, there are used semipermeable membranes which are prepared by molding cellulose acetate in the form of porous and hydrated films, or tubes, or hollow fine fibers, or other shapes.

Sealing the ends of said semipermeable membranes is an important problem in view of the uses of these membranes such as mentioned above. It is important but difficult to do so especially in the reverse osmosis procedure which is conducted under a high pressure.

Most semipermeable membranes, which are used in the reverse osmosis procedure, comprise a hydrated cellulose acetate membrane which has a low mechanical strength. Except when an adhesive is used, sealing the ends of the membrane requires a remarkably high mechanical pressure, so that the part sealed is liable to be damaged and such damage will cause leakage of the liquid being treated.

Moreover, there are various problems in the known procedures of using an adhesive to seal the ends of the usual flat film membranes and hollow fibre membranes and of using a rubber gasket to tubular membranes to seal the ends of the membranes. For example, there are problems in selecting the type of adhesive to be used and difficulties in carrying out the adhesion operation and in the reliability of the adhesion.

Further, when a cylindrical gasket is used to tubular membranes, the resistance to flow is increased and this is likely to cause damage of the membrane.

It is an object of the present invention to provide a solution to these various problems.

SUMMARY OF THE INVENTION

According to the invention, it is possible to remarkably shorten the process by employing a procedure of directly applying and forming a semipermeable membrane on the support and simultaneously sealing the ends of same to obtain a more reliable assembly. More particularly, the present invention relates to a process for producing a supported semipermeable membrane in which sealing members are affixed to the ends of a permeable support and a semipermeable membrane forming solution is directly applied on the support and the sealing members to cover them with a continuous semipermeable membrane, said sealing members being made of a material which can be dissolved by the semipermeable membrane forming solution to form a welded unity with the semipermeable membrane, whereby the ends of the membrane are sealed without the use of an adhesive.

The details of the present invention are explained by reference to the attached drawing.

BRIEF DESCRIPTION OF THE DRAWING

Referring to FIG. 1, there is illustrated one end of an assembly comprising an outer, fluid permeable, supporting cylindrical tube 1, which may be made, for instance, of glass fiber fabric impregnated with a synthetic resin, such as polyester or epoxy resin, made so as to permit the flow of fluid transversely therethrough. The tube 1 can be made of other materials, e.g. steel mesh, dacron or nylon fabric, etc., having a sufficient strength as a support. A joint member 2, made of any suitable synthetic resin or metal, is integrally united to each end of the cylinder. This joint member 2 can be united to tube 1 by any suitable means such as metal welding, screwing by threads, integral molding by the use of fiber reinforced plastics, etc. The joint member 2 has a cylindrical portion 2a encircling the end portion of the cylinder 1, an inwardly projecting flange portion 2b abutting against the end of the cylinder 1 and an outwardly projecting flange portion 2c. An annular recess 2d is provided between the flange 2b and the outer axial end of the joint member 2. A cap 3 is integrally united to the joint member 2 by any suitable means such as simple insertion, screwing by threads or the use of adhesive. The cap has an axially extending annular portion 3a filling the recess 2d and an outwardly extending flange portion 3b abutting against the flange 2c. The cap 3 is made, for example, of a cellulose acetate plastic, in case the semipermeable membrane is made of cellulose acetate.

Figure 1:
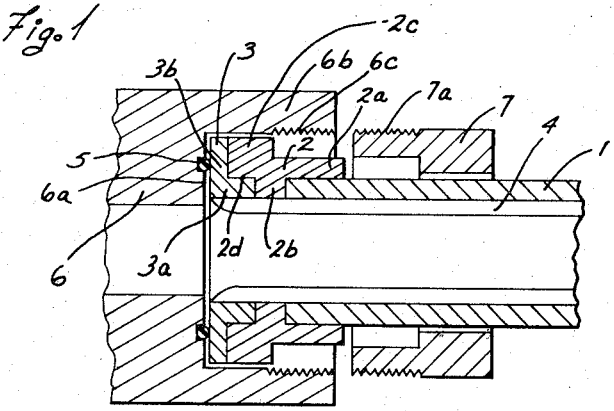
FIG. 1 is a cross section of one end of an assembly according to the invention in which a semipermeable membrane is provided on a tubular support.

An annular, semipermeable membrane 4 is formed on and united to the inside surface of the cylinder 1. Said membrane 4 also covers and is united to the inner surfaces of the joint member 2 and cap member 3.

As the material to form the membrane 4, cellulose acetate is preferable, and, therefore, the following explanation will be made with a particular reference to a cellulose acetate membrane, but membranes made of other suitable materials such as polyamides (nylon) can be used. Further, the cap 3 can be made of a material which can be dissolved by the semipermeable membrane forming solution to form a welded unity with the formed semipermeable membrane.

The membrane 4 is formed in situ by dissolving cellulose acetate in a solvent and a swelling agent and then applying and spreading a continuous layer of the resulting solution on the inner surfaces of the cylinder 1, the joint member 2 and the cap 3, following which the solvent is evaporated. Thereafter, the assembly is immersed in ice water to form the semipermeable membrane 4. It is to be noted that the membrane is integrally united to and sealed with the cap 3 as a result of the foregoing operations. Particularly, because both the cap 3 and the membrane 4 are made of cellulose acetate, the solvent in the cellulose acetate solution will also dissolve the inner surface layer of the cap 3 over the entirety of said inner surface layer with the cellulose acetate solution. Thus, upon evaporation of the solvent, the membrane 4 will be fixedly bonded to the cap 3 over the entirety of the inner surface layer thereof. Therefore, a separate operation for sealing the ends of the membrane is not required.

If desired or necessary, the inner surface of cap 3 can be treated separately with solvent, prior to applying the cellulose acetate solution thereto, in order further to improve the effectiveness of the bond between the membrane and the cap.

If desired, instead of being a separately molded part, the cap 3 can be formed by applying a cellulose acetate solution, containing a relatively high content by weight of cellulose acetate, to the joint member 2 and forming same in situ to the shape of the cap 3. Thereafter, the membrane can be formed as above described.

The semipermeable membrane 4 can be treated by additional steps, such as heat treatment and treatment with solutions to further improve its demineralization properties. These additional treatment steps can be in accordance with known techniques for preparing semipermeable membranes as disclosed, for example in Japanese Patent Publication No. 2818/1967 and Office of Saline Water, R & D Progress Report No. 434, U.S.A.

After treatment of the semipermeable membrane has been completed, the assembly can be secured to headers or end plates 6 by the cap nut 7. An O-ring 5 is positioned between a seat 6a of the header 6 and the cap 3. The cap nut 7 has a thread 7a on the outer surface thereof and it is screwed into the thread 6c provided on the inner surface of an axially extending annular portion 6b of the end plate 6 to be tightened by forcing the O-ring surface of the cap 3 against the seat 6a of the end plate 6. The tightening of the nut does not act on the membrane 4 so that said membrane will not be damaged.

Figure 2:
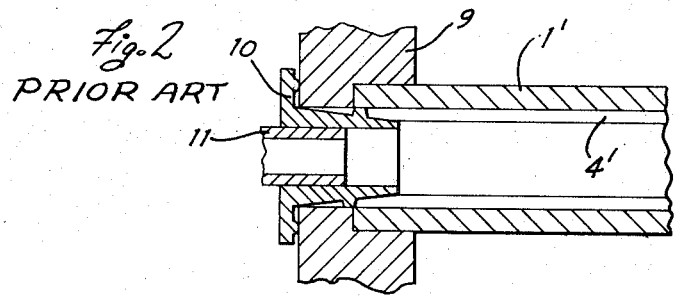
FIG. 2 is a cross section of a tubular support having a tubular semipermeable membrane which is sealed with a cylindrical grommet and a grommet expander according to a prior art procedure.

FIG. 2 illustrates a prior art sealing method of tubular semipermeable membrane with a rubber grommet and a grommet expander. Corresponding parts are indicated by the same numerals with a prime mark added thereto.

In FIG. 2, there is illustrated one end of an assembly comprising an outer, fluid permeable, supporting cylindrical tube 1' and a semipermeable membrane 4' lined on the inner wall of the tube 1'. All the support tubes 1' are fitted into tube sheets 9 and rubber grommets 10 are placed in each end of the membrane lined tubes 1'. Further, grommet expanders 11 are inserted into the grommets 10 to force the grommets against the membrane 4'. In the final assembly operation, gaskets and end plates (not shown) are bolted to the tube sheet 9. In such a prior art sealing method as shown in FIG. 2, the membrane 4' is liable to be damaged on the reason as explained above.

Figure 3:
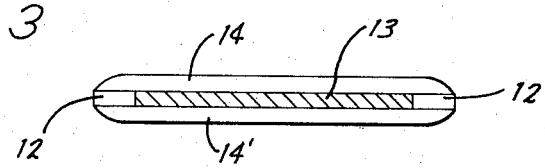
FIG. 3 is a cross section of a semipermeable membrane comprising a flat support having on both sides thereof a semipermeable membrane of flat film or sheet, according to the present invention.

FIG. 3 illustrates a modification of the invention in which a flat membrane is provided. Here the permeable glass fiber support 13 is flat and it has semipermeable membranes 14 and 14' applied to the opposite sides thereof. Cellulose acetate fringes 12 and 12' are disposed as sealing members at the ends of and united to the support 13. The membranes 14 and 14' cover and are united to the sides of the fringes 12 and 12'.

Figure 4:
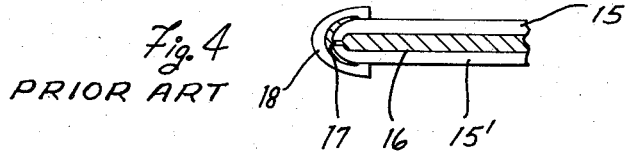
FIG. 4 is a cross section illustrating the sealing of a flat semipermeable membrane to a support with the use of an adhesive according to a prior art procedure.

FIG. 4 shows, for purposes of comparison, a prior art construction in which the ends of the membranes 15 and 15' applied to the opposite sides of the support 16 are bonded together and covered by an adhesive 17 and a reinforcement films 18 is placed thereon.

EXAMPLE 1

The composition of the solution for forming the semipermeable membrane was as follows:

Cellulose acetate (Daicel's VAC: tradename) 20 percent by weight
Acetone 48 percent
Formamide 32 percent
Cellulose acetate material for cap 3 — Daicel's VAC
Evaporation time — 25 to 60 seconds
immersing time in ice water — 1 hour
temperature of the ice water — 0°C.
temperature of heat treatment — 85°C.

Using said materials and conditions, a semipermeable membrane was formed on the permeable support 1 by supplying and casting said solution onto said support to form a semipermeable membrane having a demineralization ratio of 95 percent to a 0.35 percent aqueous solution of NaCl and a water permeability of 0.80 m/day.

EXAMPLE 2

Except for the fact that a dense cellulose acetate membrane was formed instead of said cellulose acetate cap in Example 1, the other conditions of Example 1 were followed and similar results were obtained.

Attention is directed to copending applications Ser. No. 213,824 filed Dec. 29, 1971 entitled "Process for Modifying Cellulose Acetate" and Ser. No. 213,825 filed Dec. 29, 1971 entitled "Process for Modifying Cellulose Acetate" which described processes for preparing semipermeable modified cellulose acetate membranes which may be employed in the present invention.

The embodiments of the invention in which an exclusive property or privilege is claimed are defined as follows:

1. A process for producing a semipermeable membrane, which comprises:
   affixing sealing members made of a material which can be dissolved by a semipermeable membrane forming solution to the ends of a fluid permeable support;
   then applying the semipermeable membrane forming solution to at least one surface of the support and also to said sealing members to form a continuous layer covering said surface and said sealing members and in which said layer is integrally united to said sealing members by direct bonding therebetween;
   and then treating said layer to convert same into a semipermeable membrane.

2. A process according to claim 1, in which said sealing members and semipermeable membrane are made of cellulose acetate.

3. A process according to claim 1, in which said sealing members are preformed members adhesively united to said support.

4. A process according to claim 1, in which said sealing members are formed on said support, in advance of the forming of said layer, by applying a separate semipermeable membrane forming solution only to the ends of said support and then drying same.

5. A process according to claim 1, in which said treating step comprises immersing said film in ice water and then heat treating the film.

* * * * *